PATTERN RECOGNITION SYSTEM

Filed July 8, 1965 12 Sheets-Sheet 1

INVENTOR:
PETER W. BECKER,
BY Marvin L. Goldenberg
HIS ATTORNEY.

FIG.5A FIG.5B

| | n-GRAMS | FREQUENCY OF OCCURRENCE | MEAN Ma | STANDARD DEVIATION σa |
|---|---|---|---|---|
| DIGRAMS | 11 | .344 | .344 | .015 |
| | 10 | .063 | .065 | .018 |
| | 01 | .063 | .065 | .018 |
| | 00 | .532 | .531 | .014 |
| TRIGRAMS | 111 | .281 | .280 | .016 |
| | 110 | .063 | .063 | .006 |
| | 101 | | | |
| | 100 | .063 | .062 | .012 |
| | 011 | .063 | .064 | .006 |
| | 010 | | | |
| | 001 | .063 | .061 | .017 |
| | 000 | .469 | .470 | .006 |
| TETRAGRAMS | 1111 | .219 | .220 | .005 |
| | 1110 | .063 | .063 | .004 |
| | 1101 | | | |
| | 1100 | .063 | .065 | .009 |
| | 1011 | | | |
| | 1010 | | | |
| | 1001 | | | |
| | 1000 | .063 | .063 | .007 |
| | 0111 | .063 | .062 | .012 |
| | 0110 | | | |
| | 0101 | | | |
| | 0100 | | | |
| | 0011 | .063 | .063 | .004 |
| | 0010 | | | |
| | 0001 | .063 | .061 | .006 |
| | 0000 | .407 | .407 | .005 |

INVENTOR:
PETER W. BECKER,
BY Marvin L. Goldenberg
HIS ATTORNEY.

FIG. 6A FIG. 6B

| DI-DELAY-GRAMS | FREQUENCIES OF OCCURRENCE | MEAN Ma | STANDARD DEVIATION σa |
|---|---|---|---|
| 1-1 | .281 | .280 | .014 |
| 1--1 | .219 | .218 | .013 |
| 1---1 | .187 | .189 | .014 |
| 1----1 | .156 | .154 | .012 |
| 1-----1 | .156 | .155 | .011 |
| 1------1 | .156 | .156 | .012 |
| 1-------1 | .156 | .155 | .013 |
| 1-0 | .125 | .124 | .011 |
| 1--0 | .187 | .188 | .009 |
| 1---0 | .219 | .219 | .011 |
| 1----0 | .250 | .250 | .008 |
| 1-----0 | .250 | .248 | .009 |
| 1------0 | .250 | .249 | .008 |
| 1-------0 | .250 | .251 | .008 |
| 0-1 | .125 | .124 | .011 |
| 0--1 | .187 | .187 | .009 |
| 0---1 | .219 | .219 | .011 |
| 0----1 | .250 | .249 | .008 |
| 0-----1 | .250 | .251 | .008 |
| 0------1 | .250 | .249 | .008 |
| 0-------1 | .250 | .250 | .009 |
| 0-0 | .469 | .470 | .015 |
| 0--0 | .407 | .409 | .013 |
| 0---0 | .375 | .375 | .013 |
| 0----0 | .344 | .346 | .012 |
| 0-----0 | .344 | .342 | .013 |
| 0------0 | .344 | .343 | .011 |
| 0-------0 | .344 | .344 | .012 |

INVENTOR:
PETER W. BECKER,
BY [signature]
HIS ATTORNEY.

FIG. 7A FIG. 7B

| | n-GRAMS | FREQUENCIES OF OCCURRENCE | MEAN Mb | STANDARD DEVIATION σb |
|---|---|---|---|---|
| DIGRAMS | 11 | .437 | .436 | .016 |
| | 10 | .063 | .064 | .012 |
| | 01 | .063 | .063 | .012 |
| | 00 | .437 | .435 | .015 |
| TRIGRAMS | 111 | .375 | .376 | .016 |
| | 110 | .063 | .063 | .005 |
| | 101 | | | |
| | 100 | .063 | .061 | .012 |
| | 011 | .063 | .064 | .006 |
| | 010 | | | |
| | 001 | .063 | .063 | .005 |
| | 000 | .375 | .376 | .017 |
| TETRAGRAMS | 1111 | .313 | .313 | .004 |
| | 1110 | .063 | .062 | .009 |
| | 1101 | | | |
| | 1100 | .063 | .063 | .005 |
| | 1011 | | | |
| | 1010 | | | |
| | 1001 | .031 | .030 | .006 |
| | 1000 | .031 | .032 | .012 |
| | 0111 | .063 | .064 | .004 |
| | 0110 | | | |
| | 0101 | | | |
| | 0100 | | | |
| | 0011 | .063 | .062 | .005 |
| | 0010 | | | |
| | 0001 | .031 | .031 | .004 |
| | 0000 | .344 | .345 | .007 |

INVENTOR:
PETER W. BECKER,
BY Marvin L. Goldenberg
HIS ATTORNEY.

FIG. 8A FIG. 8B

| DI-DELAY-GRAMS | FREQUENCIES OF OCCURRENCE | MEAN $M_b$ | STANDARD DEVIATION $\sigma_b$ |
|---|---|---|---|
| 1-1 | .375 | .375 | .015 |
| 1--1 | .344 | .345 | .013 |
| 1---1 | .313 | .314 | .014 |
| 1----1 | .281 | .280 | .014 |
| 1-----1 | .281 | .282 | .013 |
| 1------1 | .281 | .281 | .012 |
| 1-------1 | .250 | .249 | .012 |
| 1-0 | .125 | .124 | .012 |
| 1--0 | .156 | .157 | .009 |
| 1---0 | .187 | .187 | .011 |
| 1----0 | .219 | .220 | .010 |
| 1-----0 | .219 | .219 | .009 |
| 1------0 | .219 | .218 | .008 |
| 1-------0 | .250 | .250 | .007 |
| 0-1 | .125 | .124 | .012 |
| 0--1 | .156 | .157 | .009 |
| 0---1 | .187 | .188 | .011 |
| 0----1 | .219 | .220 | .009 |
| 0-----1 | .219 | .219 | .010 |
| 0------1 | .219 | .220 | .008 |
| 0-------1 | .281 | .280 | .008 |
| 0-0 | .375 | .375 | .014 |
| 0--0 | .344 | .345 | .013 |
| 0---0 | .313 | .314 | .014 |
| 0----0 | .281 | .280 | .012 |
| 0-----0 | .281 | .281 | .012 |
| 0------0 | .281 | .279 | .011 |
| 0-------0 | .219 | .219 | .012 |

INVENTOR:
PETER W. BECKER,
BY Marvin C. Goldenberg
HIS ATTORNEY.

INVENTOR:
PETER W. BECKER,
BY Maurice L. Goldenberg
HIS ATTORNEY.

INVENTOR:
PETER W. BECKER,
BY Marvin L. Goldenberg
HIS ATTORNEY.

INVENTOR:
PETER W. BECKER,
BY Marvin D. Goldenberg
HIS ATTORNEY

INVENTOR:
PETER W. BECKER,
BY Marvin L. Goldenberg
HIS ATTORNEY.

INVENTOR
PETER W. BECKER,
BY [signature]
HIS ATTORNEY.

INVENTOR:
PETER W. BECKER,
BY Marvin L. Goldenberg
HIS ATTORNEY.

PATTERN RECOGNITION SYSTEM

Filed July 8, 1965

INVENTOR:
PETER W. BECKER,
BY Marvin Goldenberg
HIS ATTORNEY.

United States Patent Office 3,521,235

Patented July 21, 1970

3,521,235

PATTERN RECOGNITION SYSTEM

Peter W. Becker, Syracuse, N.Y., assignor to General Electric Company, a corporation of New York Filed July 8, 1965, Ser. No. 470,379
Int. Cl. G06r *9/00*
U.S. Cl. 340—146.3 13 Claims

ABSTRACT OF THE DISCLOSURE

A pattern recognition system including a learning phase and a recognition phase for identifying patterns, which may be electrical analog waveforms converted into corresponding digital codes. In the learning phase the tabulated frequencies of occurrence of selected binary words occurring within said digital codes are employed to determine those binary words which best identify and distinguish said codes, and therefore the patterns. In the recognition phase, the distinguishing binary words are employed to identify and distinguish unknown patterns.

The invention relates to pattern recognition systems of the type which analyze and discriminate among patterns of relatively complex form and, more particularly, to a novel system of this type that employs digital techniques in its operation.

The invention has application to the field of signal analysis wherein comlex patterns of various types, normally in the form of electrical waveforms, may be grouped in accordance with certain distinguishing characteristics relatively invariant with respect to waveform members of a single group or class and which provide separation of the waveform members as between classes. By effectively identifying these characteristics the invention provides a highly accurate means for discriminating the different waveforms. In particular the invention has important application to the field of engine noise analysis and speech recognition, as well as to the analysis of such electrical signals as electrocardiogram and lie detector signals.

With respect to engine noise analysis, it is recognized that certain engine malfunctions generate sounds that are characteristic of the malfunction. These sounds have been detected to a degree by the human ear and certain of the malfunctions thereby discovered. If the sounds are identified by means of a pattern recognition scheme, there is provided a way to automatically determine engine malfunction. These characteristic sounds, however, are not readily detectable in the overall generated engine noise. Common methods of waveform analysis utilizing filter banks and the like, have not been found to be effective. The present invention is intended to appreciably improve upon existing methods used and to provide a system which effectively discriminates the characterstic sounds so as to enable one to detect extensive engine malfunctions automatically.

A similar difficulty exists with respect to a machine recognition of speech sounds. Because speech is so complex in its composition, presently developed recognition systems have been found to be inadequate in providing a comprehensive detection of speech. The system of the invention is intended to provide appreciable improvement in this area.

It is an object of the invention to provide an improved pattern recognition system which utilizes a novel digital technique for identifying patterns of unknown origin.

It is another object of the invention to provide a novel pattern recognition system having a learning ability enabling it to select digital characteristics which effectively distinguish patterns of different origin.

It is a further object of the invention to provide an improved pattern recognition system for identifying unknown patterns by an orderly comparison of digital characteristics of said unknown patterns with the digital characteristics of patterns of known origin.

It is a still further object of the invention to provide a pattern recognition system as above described wherein said patterns, which may contain various kinds of information, are processed as electrical waveforms.

It is another object of the invention of a more specific nature to provide novel means as above described for reliably detecting engine malfunctions by processing the sonic outputs of a number of different engines.

It is another specific object of the invention to provide novel means for detecting speech sounds or events.

In accordance with the invention, the above and other objects are accomplished by a novel pattern recognition system comprising basically two phases, a learning phase and a recognition phase, which system can be organized to identify an applied pattern of unknown origin as belonging to one or possibly more of a finite number of familiar origins, i.e., classes of patterns. In the learning phase a multiplicity of patterns of known origin are processed as electrical waveforms so as to determine digital characteristics of said waveforms which exhibit an invariant property with respect to waveforms of a single class and which best distinguish waveforms of one class from those of every other class. In the recognition phase, the distinguishing digital characteristics selected by the learning phase are employed to identify unknown waveforms as belonging to one of the previously considered classes of waveforms. For example, these patterns can be the sonic outputs, taken over a given period of time, from jet engines known to be of normal operation and jet engines known to have some discrete malfunction such as a damaged main bearing, gear box, etc. The digital characteristics distinguishing the sounds of normally operating engines and the different malfunctioning engines are determined in the learning phase and employed in the recognition phase to identify by its sonic output an engine of unknown operation.

More particularly, the learning phase includes a sampling and encoding apparatus which samples the applied waveforms in a prescribed manner and converts them into digital form in accordance with a given algorithm. For example, samples of positive value may be coded as a binary "1" and samples of negative value as a binary "0." A digital characteristic tabulating apparatus receives each digitized waveform and tabulates the frequencies of occurrence of various binary word characteristics contained within the digitized sequence. These binary words will normally take the form of $n$-grams, in which there are adjacent bits of "1's" and "0's" $n$ in number, and $n$-delay-grams in which various delays are interposed between the bits of each word. An orderly comparison of the tabulated frequencies of occurrence is made for providing a preliminary determination of those binary words which appear to be least common to waveforms of different classes. In a prefered embodiment of the invention this function is performed by a binary word processing apparatus which, in a first section, obtains the mean and standard deviation values of the tabulated frequencies of occurrence for the waveforms of each class. In the second section of said binary word processing apparatus, the mean and standard deviation values for each characteristic are compared as between classes and there are selected those characteristics which appear to best distinguish waveforms of different classes. The binary word processing means may include, with respect to each characteristic, means for obtaining a quotient of the difference of the mean values and the sum of the standard deviation values for characteristics of waveform classes taken in pairs. The learning phase finally includes a categorizing means for establishing in a multi-dimensioned decision space, having dimensions equal in number to the number of distinguishing characteristics selected, a hyper-plane which separates all waveforms of one class from all waveforms of a sceond class. More particularly, the categorizing means assigns weighting factors for the frequencies of occurrence of the selected characteristics so as to produce weighted sums for the selected characteristics of a given class which are separable from the weighted sums of a different class.

To the recognition phase is applied an unknown waveform belonging to one of the previously considered classes. The recognition phase includes a sampling and encoding apparatus, identical to that in the learning phase, which converts the applied waveform into digital forms. A characteristic tabulating apparatus is provided for tabulating the occurrence frequencies for those characteristics that have been previously selected as providing the best distinction. Finally, means are included for weighting the frequencies of occurrence in accordance with the assigned weighting factors, and the unknown waveform may thereby be identified by the weighted sum as belonging to a specific one of the previously considered classes.

In the jet engine noise analysis embodiments of the invention, as well as other waveform analysis embodiments wherein the gross properties of the waveforms are statistically constant over a given period of time, sampling is usualy performed at a fixed frequency which together with the sampling duration is set so as to obtain an adequate, representative number of waveform samples. The frequencies of occurrence of the various selected binary words are tabulated over a fixed increment of time.

With respect to the speech recognition embodiment of the invention wherein the waveform properties are not statistically constant with time, the sampling frequency is established as a function of the waveform. For example, sampling may be performed at each point the waveform goes through a zero slope. Further, the frequencies of occurrence of the selected binary words are tabulated over variable time increments, each time increment corresponding to a speech event.

While the specification concludes with claims particularly pointing out and distinctly claiming the subject matter which is regarded as the invention, it is believed that the invention will be better understood from the following description taken in connection with the accompanying drawings in which:

FIG. 5A is a chart of various *n*-gram binary words, and their frequencies of occurrence, contained in the digital code of the first exemplary waveform;

FIG. 5B is a chart of the mean and standard deviation values of *n*-grams for waveforms of the class of the first exemplary waveform;

FIG. 6A is a chart of various di-delay-grams and their frequencies of occurrence, contained in the digital code of the first exemplary waveform;

FIG. 6B is a chart of the mean and standard deviation values of di-delay-grams for waveforms of the class of the first exemplary waveform;

FIG. 7A is a chart of various *n*-gram binary words, and their frequencies of occurrence, contained in the digital code of the second exemplary waveform;

FIG. 7B is a chart of the mean and standard deviation values of *n*-grams for waveforms of the class of the second exemplary waveform;

FIG. 8A is a chart of various di-delay-grams and their frequencies of occurrence, contained in the digital code of the second exemplary waveform;

FIG. 8B is a chart of the mean and standard deviation values of the di-delay-grams for waveforms of the class of the second exemplary waveform;

Figures 1, 9:
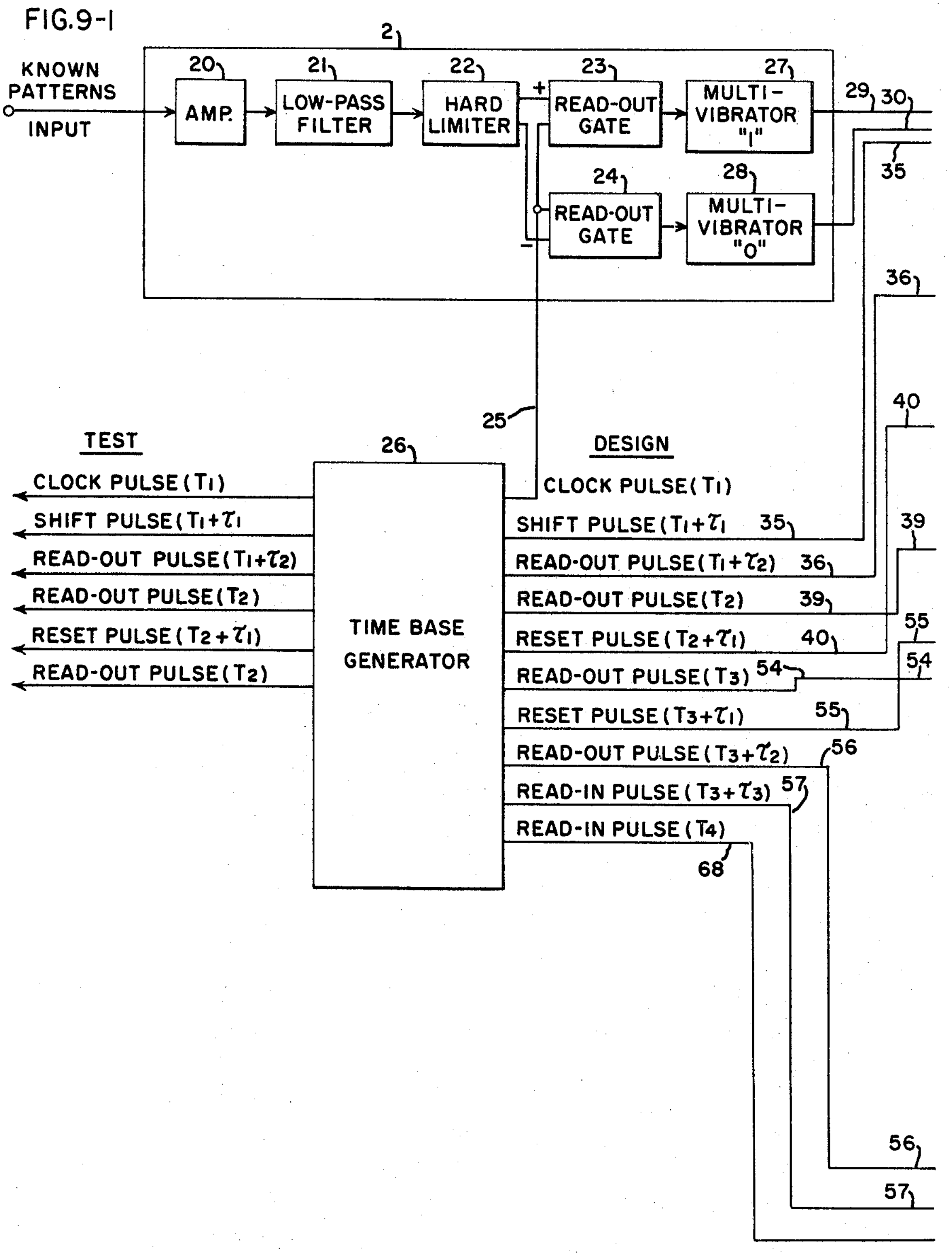
Figures 2, 9:
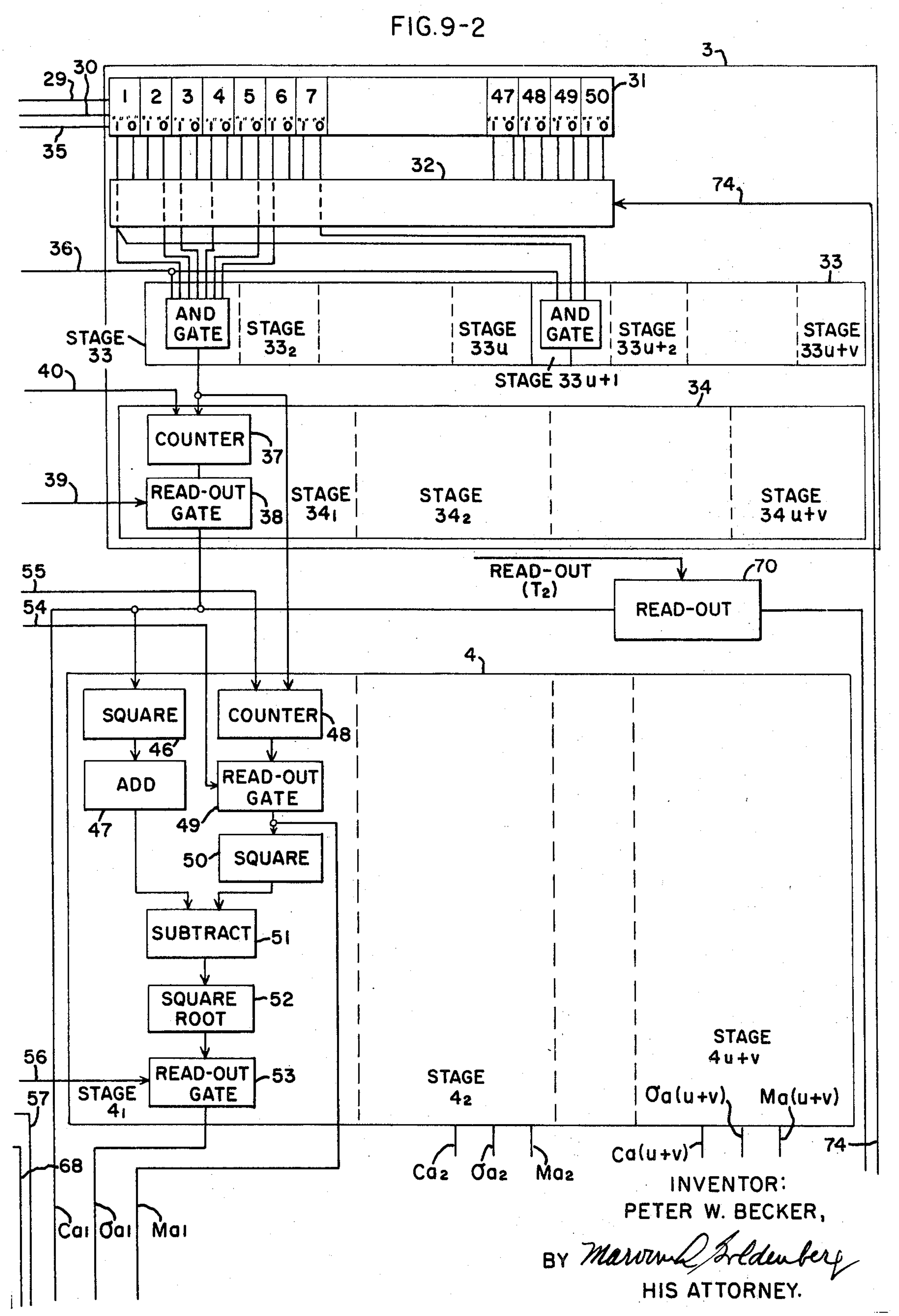
Figures 3, 9:
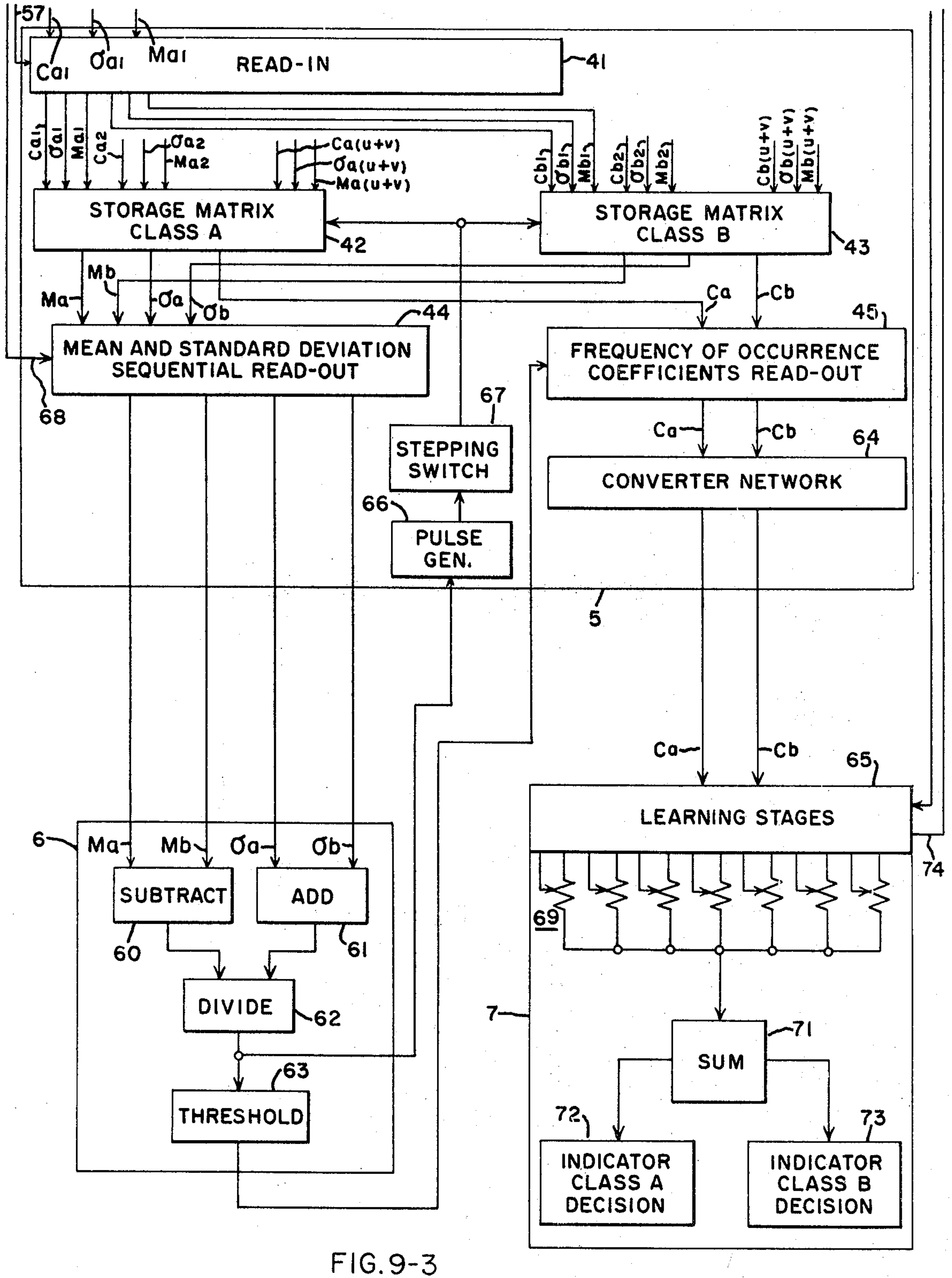
Figure 10:
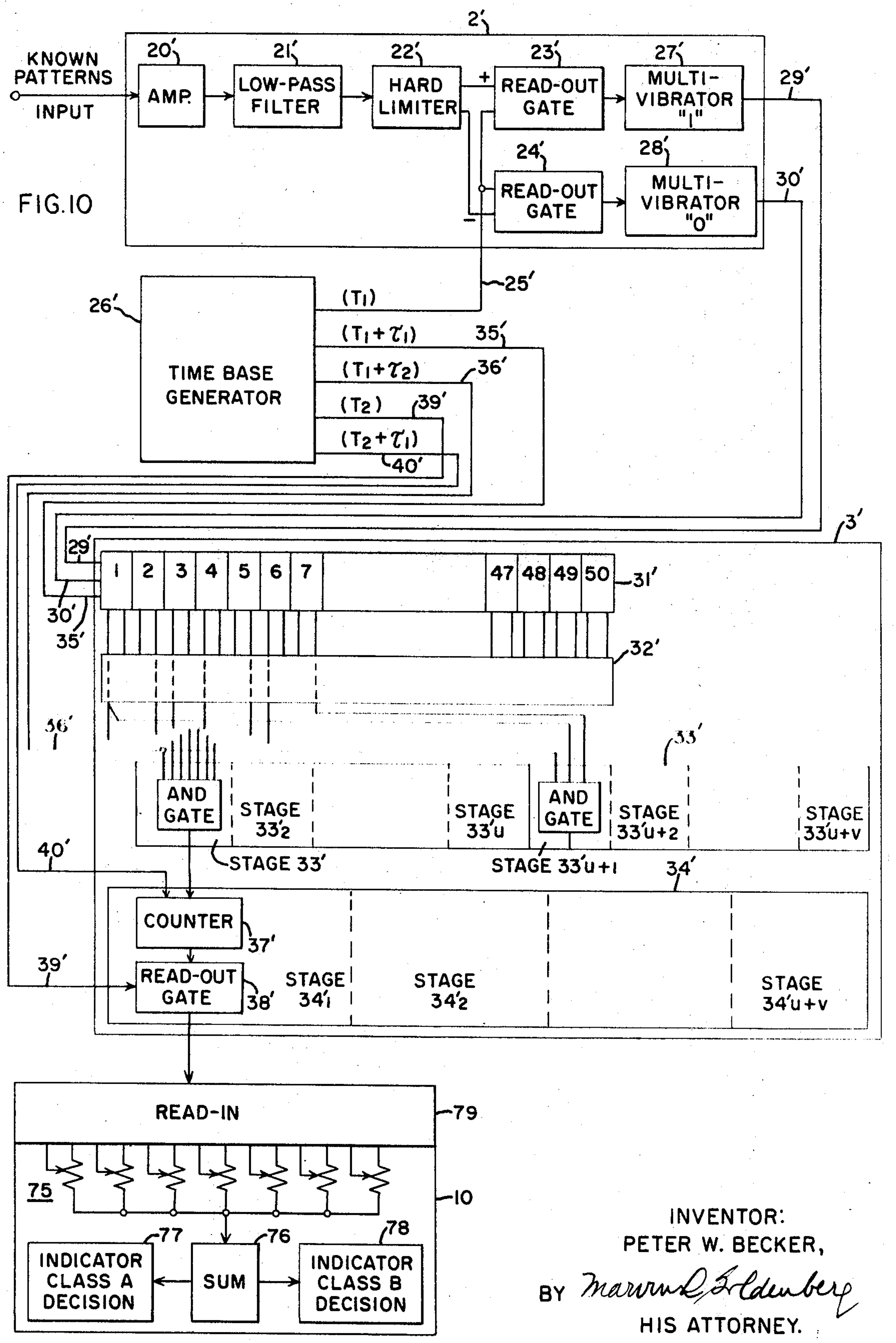
Figure 11:
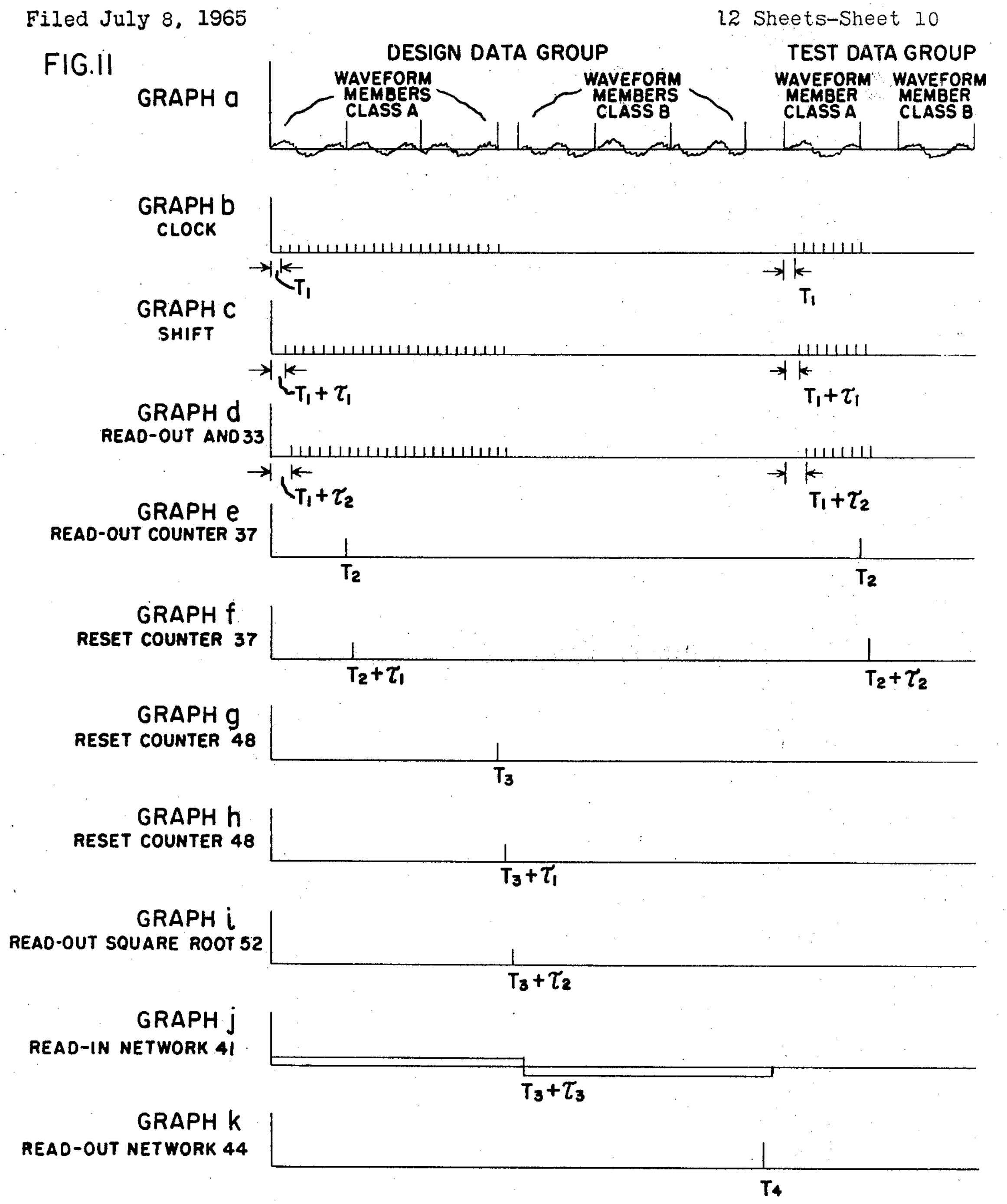
Figure 12:
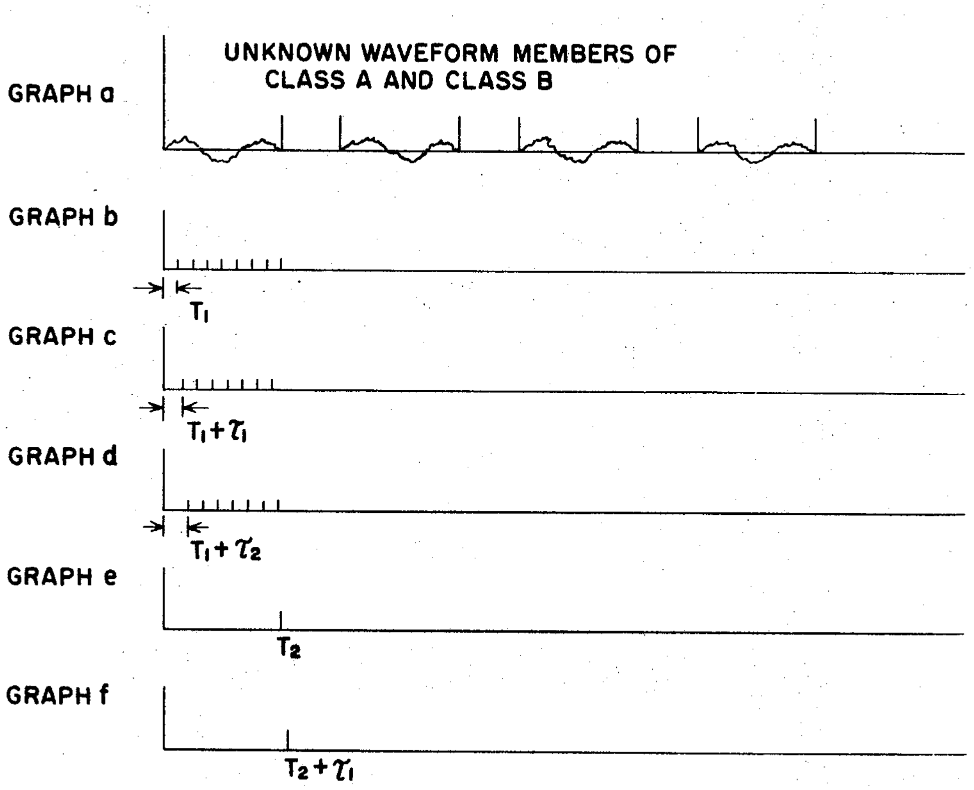
Figure 13:
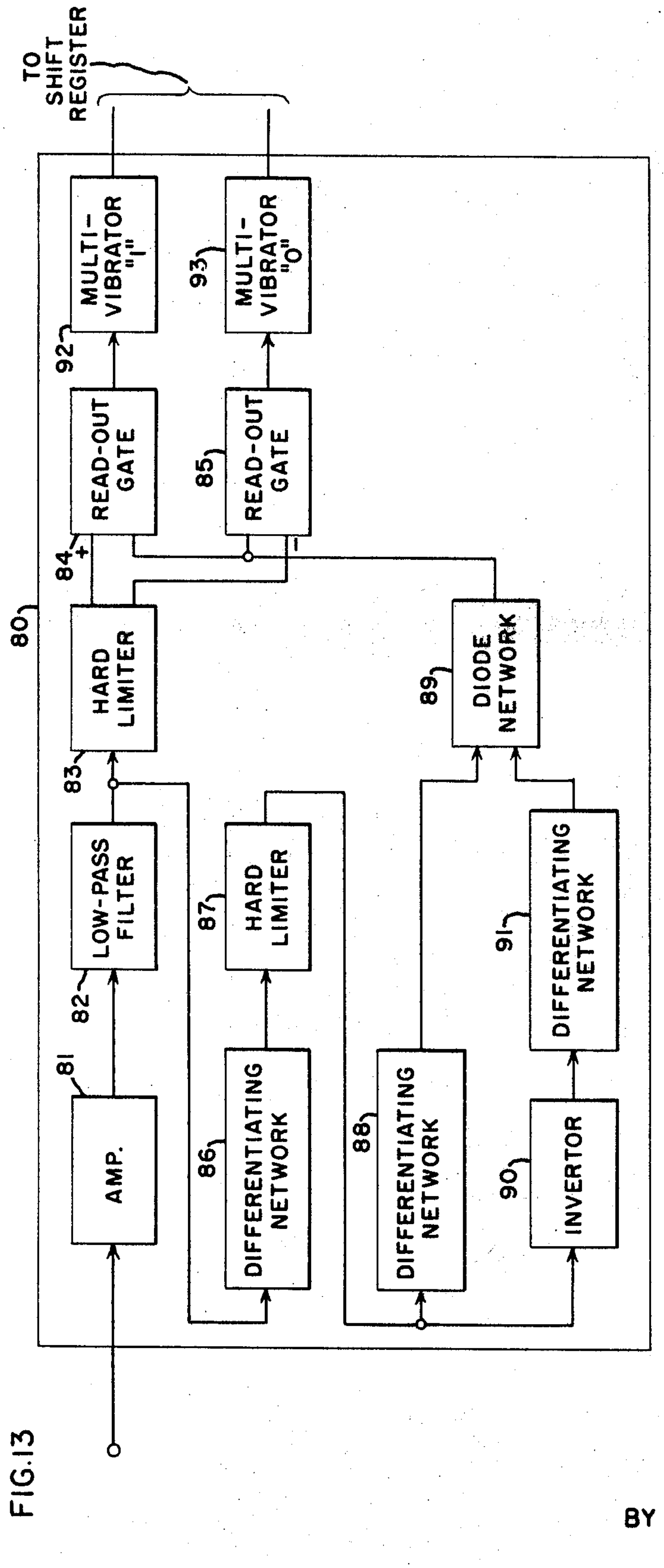
Figure 14:
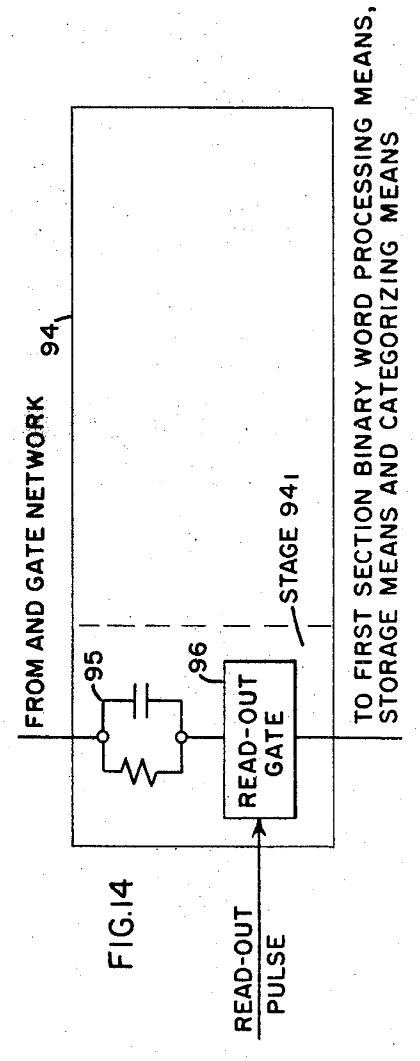

FIGS. 9–1, 9–2, and 9–3 detailed block diagrams of the learning phase of one embodiment of the invention wherein properties of the analyzed waveforms are statistically constant;

FIG. 10 is a detailed block diagram of the recognition phase of said one embodiment;

FIG. 11 is a timing diagram which is useful in the explanation of FIG. 9;

FIG. 12 is a timing diagram used in the explanation of FIG. 10;

FIG. 13 is a block diagram of a modified sampling and encoding means used in a speech recognition embodiment of the invention; and FIG. 14 is a schematic diagram of the integrating circuit used in the speech recognition embodiment.

Figures 1, 2:
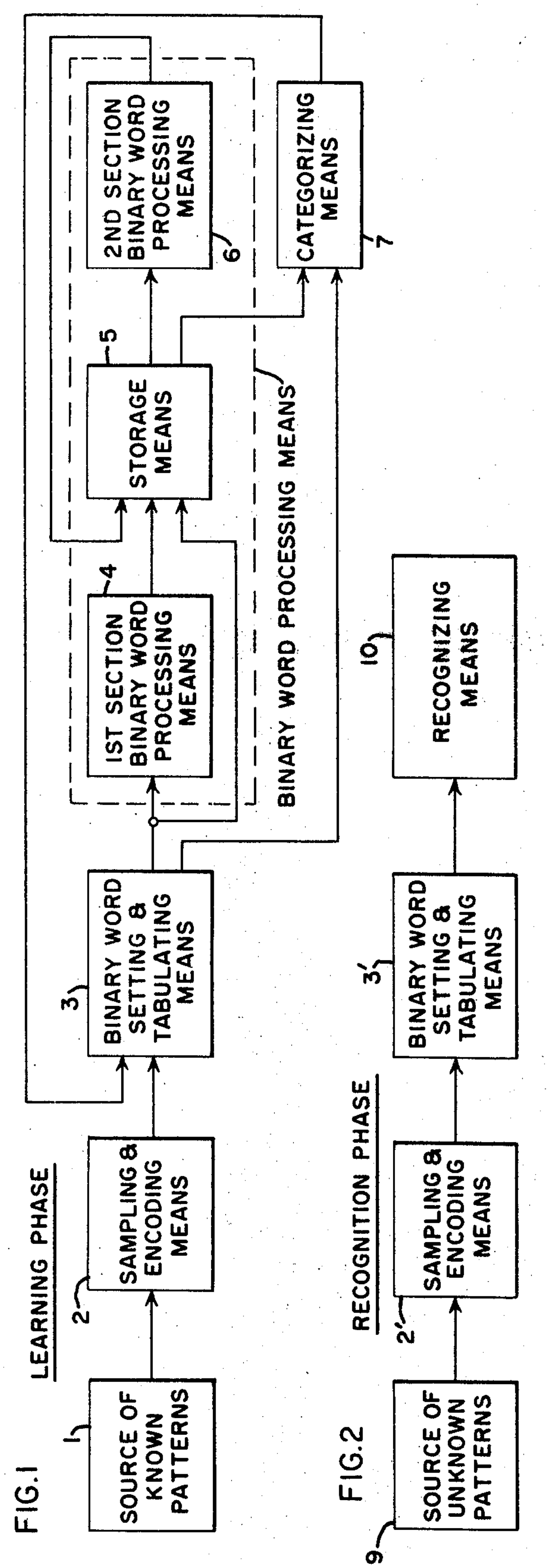
FIG. 1 is a schematic block diagram of the learning phase of a pattern recognition system in accordance with the invention.
FIG. 2 is a schematic block diagram of the recognition phase of the pattern recognition system.

With specific reference to the drawing, in FIGS. 1 and 2 there is illustrated in general block diagram form a pattern recognition system which responds to patterns of information, applied as electrical waveforms. The system includes a learning phase, illustrated in FIG. 1, and a recognition phase, illustrated in FIG. 2. In the learning phase a large number of representative patterns known to belong to particular classes are processed in a novel manner to be described, so as to provide distinguishing digital characteristics of said patterns that are essentially invariant with respect to patterns of a single class and which may be employed to separate patterns of different classes. These distinguishing digital characteristics are then used in the recognition phase to identify applied patterns of unknown origin as belonging to one or more of the previously considered classes.

The learning phase of FIG. 1 includes a source 1 of known patterns and a sampling and binary encoding means 2 to which said patterns, in the form of electrical analog waveforms, are sequentially applied. The origin of these waveforms may be of many different forms, depending upon the application being made of the system, being generally physical or electrical in nature. Further, the waveforms are normally of a relatively complex nature having frequency, phase and amplitude variations which can be related to certain significant differences regarding the origin. By detecting the variations, useful information may be obtained with respect to the waveforms and to their origin. In one specific application that has been made of the invention, the waveforms are derived from the sonic output of jet engines of different operating conditions, e.g., normally operating engines and engines with specific malfunctions, such as a defective main bearing, gear box, flow divider, etc. For each engine characteristic a class of waveforms, which may number typically 50 or more, are derived. It should be clear, however, that the basic principles of the invention should not be restricted to the specific embodiment or application herein described, but rather have a general application in the field of waveform analysis.

In a typical operation, the waveforms are stored on magnetic tape from which they are taken and applied in sequential fashion to the sampling and encoding means 2. In graph *a* of FIG. 11, to be referred to in greater detail when describing the detailed block diagram of FIGS. 9 and 10, is illustrated a sequence of waveform members for a given class. In the example under consideration, the sampling and encoding means 2 samples the applied waveforms at a prescribed sampling rate. The rate is determined primarily by the properties of the waveform being processed and the sampling duration. In this example a fixed sampling rate of 5 kc. is employed, with a sampling period of from a fraction of a second to a few seconds. The sampled waveform is encoded into a digital form in accordance with a given algorithm, or encoding technique, wherein each sample is identified as a binary "1" or "0" information bit. The algorithm employed is not critical, but is usually selected to provide a digital code conveying the most useful information.

Figure 4:
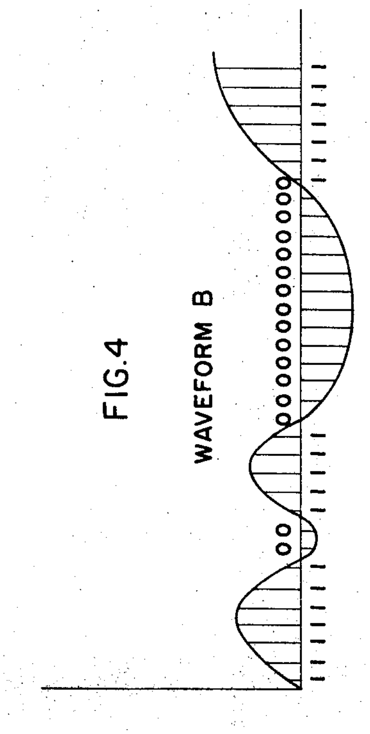
FIG. 4 is a second exemplary waveform employed in the explanation of the invention.
Figure 3:
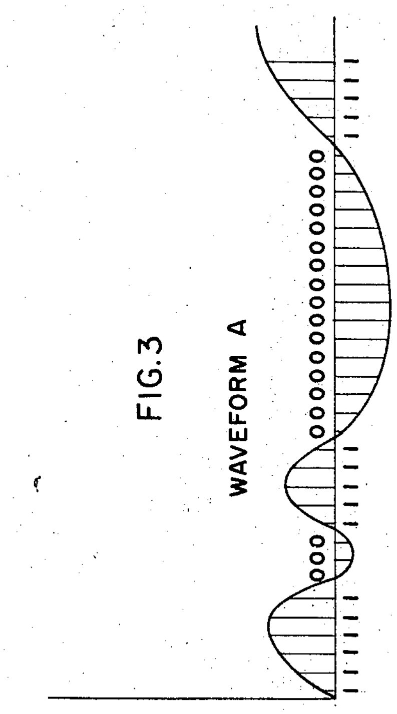
FIG. 3 is a first exemplary waveform employed in the explanation of the invention.

In FIGS. 3 and 4 are shown analog waveforms A and B, respectively, which for purposes of explanation may be considered to be typical of the waveforms of two different classes. With the waveforms A and B are presented their corresponding digital codes. In the algorithm selected for this example, a "1" indicates samples of positive polarity and a "0" indicates samples of negative polarity or zero values. It should be understood that the illustrated waveforms are given merely by way of example to assist in the description of the invention. In practice, a processed waveform has a much greater period and many more samples are employed than the number illustrated.

The digitized output from the sampling encoding means 2 is applied to a binary word setting and tabulating means 3 wherein the frequencies of occurrence of various binary words contained within the digital code are tabulated. The binary words being considered are in the form of *n*-grams and *n*-delay-grams. An *n*-gram is a binary word wherein all digits are adjacent, the number of digits corresponding to the order of *n*. For example, an *n*-gram with *n* equal to 2 is a digram, a two digit word; an *n*-gram with *n* equal to 3 is a trigram, a three digit word; there being successively tetragrams, pentagrams, hexagrams, etc. In FIGS. 5A and 7A are illustrated a number of *n*-grams through tetragrams and their frequencies of occurrence for the illustrated waveforms A and B, respectively. An *n*-delay-gram is essentially an *n*-gram wherein there are delays of various lengths interposed between the digits of the word. For example, a di-delay-gram has various delays between two digits; a tri-delay-gram has various delays between three digits, etc. In the example under consideration only di-delay-grams will be considered. A limited quantity of these words and their frequencies of occurrence for the illustrated waveforms A and B are presented in FIGS. 6A and 8A, respectively. It is noted that in tabulating the frequencies of occurrence presented, end effects have not been taken into consideration. End effects are in fact negligible when the number of bits in a code are orders of magnitude greater than the examined binary words.

The *n*-grams provide information relating to rapid variations within analyzed waveforms. The *n*-delay-grams provide information relating to relatively slow variations. The number and kind of *n*-grams and *n*-delay-grams that are selected for preliminary tabulation is determined by a number of considerations including the number of samples available for each waveform member. Thus, the selected binary words should be sufficiently brief so that each has a mathematical possibility of occurring a number of times on a random basis, e.g., not less than 10. Further, the complexity of the circuitry, particularly the storage and shift register capacity are important considerations. Thus, the greater the capacity the longer and more numerous may be the selected binary words. A still further factor is the required accuracy of the system in recognizing unknown patterns.

The tabulated frequencies of occurrence of the various *n*-grams and di-delay-grams are applied to a binary word processing means which analyzes the tabulations and determines those binary word characteristics which appear to best distinguish the waveforms of the various classes. Specifically, the processing means may include a first section 4 for determining the mean and standard deviation values of the selected characteristics for the waveforms in each class processed, a storage means 5 for storing the means and standard deviation values, as well as the individual frequency of occurrence coefficients from tabulating means 3, and a second section 6 which compares mean and standard deviation values so as to make a preliminary selection of the best characteristics. An output from the processing means second section 6 is fed back to the storage means 5 for reading out the individual coefficients for the various processed waveforms of those characteristics selected to be best and entering these coefficients into a categorizing means 7. In response to information entered, categorizing means 7 establishes in a multi-dimensioned decision space, having dimensions equal in number to the number of distinguishing characteristics entered therein, a hyper-plane which locates all waveforms of a given class on one side of the plane only. It assigns weighting factors for the coefficients so as to produce weighted sums which, for one class of waveforms, fall within a range separable from the weighted sums of a different class of waveforms. The means 7 is itself a known computer equipment performing a known function. A categorizer typical of one that may be used is described in an article in the Review of Modern Physics, vol. 34, No. 1, January 1962, entitled "The Perceptron: A Model for Brain Functioning" by H. D. Block.

To further describe the categorizer 7, it incorporates a learning function in its operation. In response to the coefficients of a limited number of binary word characteristics derived from waveforms known to belong to one of two classes of waveforms, the categorizer assigns adjustable weighting factors which provide weighted sums that fall to one side or the other for the previously mentioned hyper-plane, the hyper-plane separating the classes of waveforms. From these weighted sums it makes a decision as to which class the member waveform of a given set of coefficients belongs. If the decision in incorrect, the weighting factors are adjusted so as to provide a correct weighted sum which correctly places the member waveform with respect to the hyper-plane. If the decision is correct, the weighting factors remain unchanged. The process is repeated for the coefficients of numerous waveforms and, after processing a sufficient number, the categorizer will make correct decisions with an accuracy that is a function of the goodness or discriminating power of the characteristics selected.

An output from categorizing means 7 is fed back to the binary word tabulating means 3 for resetting that component to select further *n*-grams, based upon those previously processed, when the categorizing means is unable to perform its function with the required accuracy. The further *n*-grams are normally of higher order. In this case the binary word processing and categorizing functions are repeated for the purpose of discovering improved characteristics which provide a better distinction.

The feed back connection is also employed to reset the means 3 so as to tabulate only the selected characteristics during the test portion of the learning phase.

The recognition phase that is illustrated in FIG. 2 includes a source 9 of unkown patterns, a sampling and encoding means 2' and a binary word tabulating means 3', the two latter components being similar in their composition to blocks 2 and 3, respectively of FIG. 1. To the sampling and encoding means 2' are applied analog waveforms each belonging to one of the classes previously processed in the learning phase, the specific class of origin being unknown. As previously considered, each waveform is sampled and transformed into a digital code. In means 3' the frequencies of occurrence of the previously selected distinguishing binary word characteristics are tabulated. The output from means 3' is coupled to a recognizing means 10 which assigns for said output previously derived weighting factors, and from the weighted values determines the class to which an applied unknown waveform belongs.

Consider now the operation of the learning and recognition phases of FIGS. 1 and 2. There will be normally available a library of waveforms of known origin comprising a multiplicity of waveforms grouped into two or more classes, wherein the waveforms of each class have certain distinguishing frequency and phase characteristics in common. For purposes of illustration there will be considered a first class of waveforms derived from the sonic output of one or more normally operating jet engines and the second class of waveforms derived from the output of one or more jet engines having a particular malfunction, such as a bearing failure. These classes, which will be referred to as class A and class B, are first divided into a design data group and a test data group, there being approximately an equal number of waveforms in each group. Let it be assumed that the waveforms A and B of FIGS. 3 and 4 are representative of the waveforms of class A and class B, respectively.

In the sequence of operation, the waveforms of the design data group of class A and then class B are processed, after which the test data waveforms of each class are sequentially processed. In the sampling and encoding means 2 a digital code for each of the waveforms is generated. In one operable embodiment there was employed a sampling rate of 5 kc. and a sampling period of 3.2 seconds, for which 16,000 samples were taken per waveform. In the waveforms that were analyzed this number of samples was found to be adequate.

In the binary word tabulating means 3 the frequencies of occurrence within the generated codes of a number of *n*-gram and *n*-delay-gram binary words are tabulated. The frequency of occurrence for each presented binary word may be expressed as $N/(b-n'+1)$ where N is the number of occurrences within the code; $b$ is the total number of digits in the code; and $n'$ is the total number of digits in the binary word, including the separating bits in the *n*-delay-grams. Since it is desirable that $b \gg n'$, in practice, the frequencies of occurrence may be treated as $N/b$.

In the further explanation herein given, with reference being made to the exemplary waveforms A and B, only a limited number of these binary words will be considered. Thus, in FIG. 5A there are illustrated the different possible *n*-grams, through the tetragrams, that appear in the digital code of waveform A. The frequencies of occurrence for each presented binary word are also indicated. The number of possible *n*-grams is equal to $2^n$ so that in FIG. 5A there are illustrated four digrams, eight trigrams and sixteen tetragrams. It may be appreciated that as the order of $n$ goes up, the total number of possible binary words increases exponentially.

In FIG. 6A the frequencies of occurrence of a limited number of di-delay-grams for the digital code of waveform A are presented. The four possible diagrams with delays through 7 are given. The frequencies of occurrence of the different possible *n*-grams and di-delay-grams may be appreciated to be a function of the code and, therefore, a function of a precise configuration of the waveform.

Similar binary words and their frequencies of occurrence for the digital code of waveform B are presented in FIGS. 7A and 8A, the *n*-grams being presented in FIG. 7A and the di-delay-grams in FIG. 8A. It should be emphasized that the binary words considered with respect to FIGS. 5A, 6A, 7A and 8A are greatly limited in number and are given primarily for illustration. In practice, it is normally desirable to employ *n*-grams that extend through hexagrams and higher, and to consider delays on the order of 50 or higher for the di-delay-grams.

The frequencies of occurrence of the individual *n*-grams and di-delay-grams that are tabulated for each of the waveforms in the design data groups of the two classes are stored in storage means 5. In addition, these frequencies of occurrence coefficients are applied to the binary word processing means first section 4 wherein there is computed the mean values M and standard deviation values $\sigma$ for each of the tabulated binary word characteristics. Typical values with respect to this information for the waveforms of class A are given in FIGS. 5B and 6B, and for the waveforms of class B are given in FIGS. 7B and 8B. The mean and standard deviation values for the two classes are stored in storage means 5.

From the computed mean and standard deviation values it may be determined in a systematic and orderly manner which of the characteristics are most useful in providing distinction between the two classes of waveforms. One method of making such selection is by comparing, for each characteristic, the ratio $$(M_a - M_b)/(\sigma_a + \sigma_b)$$

which will be herein referred to as the *m/d* ratio. This is performed in the binary word processing means second section 6.

From the *m/d* ratios, a selection is made of characteristics which appear to provide the best distinction between the two classes of waveforms. One rule for selection is to establish a threshold and accept those characteristics having *m/d* ratios which exceed the threshold. A further rule that may be used is to select a given number of those characteristics having the highest *m/d* ratios. Still a further rule to follow is to select a limited number of characteristics having *m/d* ratios which exceed an established threshold by the greatest margin.

Once the characteristics having the best *m/d* ratios are selected, the frequency of occurrence coefficients of each member of the two classes are fed from the storage means 5 to the categorizing means 7 wherein weighting functions are computed for each characteristic which is employed to separate the waveforms of the first class from the waveforms of the second class. It may be noted that the relative magnitudes of the weighting functions give an indication of which characteristics are the better ones and which are the poorer ones.

The binary word setting and tabulating means 3 is reset in accordance with the previously selected characteristics so as to confine the tabulation to these frequencies of occurrence only. The tabulated coefficients are applied to the categorizing means 7 in which they are appropriately weighted and the accuracy of the learning function may be thereby evaluated.

In the recognition phase of FIG. 2, the binary word setting and tabulating means 3' is set so as to tabulate those characteristics found in the learning phase to provide a suitably accurate operation. In addition, the recognizing means 10 is set so as to provide the weighting factors that were computed in the learning phase's categorizing means. Upon the application of an unknown waveform, the frequencies of occurrence of these characteristics are tabulated and then weighted, and it is thereby determined to which class said waveform belongs.

It is noted that most categorizing means presently available are capable of operating only with respect to two classes of patterns at one time. Further, the *m/d* criterion for determining distinguishing characteristics can be employed only with respect to two classes of waveforms. Thus, if there are more than two classes of waveforms to be considered the tabulations for each of the waveforms must be first appropriately grouped so that effectively only two classes of waveforms, or super classes are considered at one time. For example, if there are five classes of waveforms to be considered, the tabulated frequencies of occurrences will be grouped so that two of the classes of waveforms are considered as one super class and the remaining three classes of waveforms are considered as a second super class. After distinguishing characteristics are identified which separate the first and second super classes, the first super class may be then further broken down and considered as two separate classes and characteristics are identified separating them. The second super class may be broken down into two classes, wherein one of these classes is a super class. The process is repeated until discrete classification of each of the classes is accomplished.

With reference to FIG. 9, there is illustrated a detailed block diagram of one exemplary embodiment of the learning phase of the present invention in which a jet engine noise analysis is performed, which diagram takes the general form of the blocks of FIG. 1. The sampling and encoding means 2 includes at the input thereof an amplifier 20 for providing amplification of the received electrical waveforms. A sequence of several waveforms of class A followed by several waveforms of class B are illustrated in graph *a* of the timing diagram of FIG. 11 To the output of amplifier 20 is connected a low-pass filter 21 which rejects higher frequency noise components and passes only those frequencies which constitute the major portion of the jet engine sound information content. The filter 21 has a cut off frequency that is on the order of 2 kc. and passes all frequencies below this value. Coupled to the output of low-pass filter 21 is a limiter network 22 which functions as a hard limiting amplifier so as to generate a squared up waveform of a "1" logic level where the applied waveform is positive and a "0" logic level where the applied waveform is negative. A push-pull connection is made from the output of limiter network 22 to a pair of read-out gates 23 and 24, having a second input applied thereto from conductor 25, in the form of a clock pulse derived from a time base generator network 26. Said second input occurs at time $T_1$, as illustrated in graph *b* of the timing diagram of FIG. 11. The read-out gates are essentially AND gates requiring two positive polarity input pulses to provide an output pulse. Coupled to the output of read-out gate 23 is a first multivibrator network 27, and coupled to the output of read-out gate 24 is a second multivibrator network 28.

The clock pulse is generated at the sampling frequency which in the example being considered is at 5 kc., and provides a sampling of the analog input waveforms. Thus, when the analog signal at the output of the limiter network is of positive polarity, as indicated in the figure, the read-out gate 23 is actuated and in turn triggers multivibrator 27 to provide an output pulse indicative of a binary "1." Conversely, if the output of the limiter network is negative, the inverse of that illustrated, the read-out gate 24 becomes actuated and in turn triggers multivibrator 28 to provide an output pulse which is indicative of a binary "0." Accordingly, the output of the sampling and encoding means 2 are two lines 29 and 30, the first of which transmits binary "1" information bits when they are present and the second of which transmits binary "0" information bits when they are present. A digital code is thereby formed of each input analog waveform in accordance with the algorithm providing a binary "1" for all samples of positive polarity and a binary "0" for all samples of negative polarity, where the samples occur at a predetermined sampling frequency. In the specific embodiment under consideration each waveform has a duration of 3.2 seconds to provide 16,000 sample bits per waveform.

The binary word setting and tabulating means 3 includes a shift register network 31, a binary word setting switching matrix 32, a multiple input AND gate network 33 and a counter network 34. The shift register 31 in the example being considered is composed of 50 stages. The number of stages is, in general determined by the number and kinds of binary words that are to be tabulated. In this instance, it is primarily determined by the maximum length of the di-delay-grams that are to be considered. Lines 29 and 30 are applied to the first stage of the shift register 31 as the inputs thereto. Each stage includes a pair of output terminals, at one of which appears a stored binary "1" output pulse and at the other of which appears a stored binary "0" output pulse. There is further applied to each stage in conventional fashion a shift pulse. This pulse is applied along conductor 35 from time base generator network 26. The shift pulse occurs at the clock frequency at time $T_1+\tau_1$, and is illustrated in graph *c* of the timing diagram of FIG. 11.

The generated digital codes that are applied to the shift register on lines 29 and 30 are run through the register at the sampling frequency and in the process a selected number of binary words on the form *n*-grams and di-delay-grams that are contained within each digital code are examined by the multiple input AND gate network 33. The AND gate network 33 includes an array of multiple input AND gate stages, one set of which examine *n*-grams and a second set of which examine *n*-delay-grams, more specifically in this example, di-delay-grams. The number and extent of the *n*-gram examining AND gates is not fixed and will be determined in accordance with the requirements of the particular analysis being performed, limitations in the complexity of the circuit, etc. Similar considerations apply with respect to the di-delay gram AND gates.

Particular binary words are examined by connecting the shift register stage outputs which form the words to individual AND gate stages, there being one stage for each word to be examined. In addition, a read-out pulse at the clock frequency and occurring at time $T_1+\tau_2$, as illustrated in graph *d* of FIG. 11, is applied to the AND gates for reading out the shift register at appropriate times between shift pulses. This read-out pulse is derived from time base generator 26 and is applied by conductor 36. The binary word setting switching matrix 32 provides connections from the shift register stages to the numerous AND gate stages so as to provide examination of the binary words of interest. The switching operation is preferably performed automatically in response to control signals from the categorizing means 7. In this manner, as will be seen, a limited number of binary words can be processed at one time, and should examination of additional words be necessary in order to find a sufficient number of good distinguishing characteristics that may be required by the categorizing means to provide operation of high accuracy, the switching matrix can be actuated to alter the inputs to the AND gate stages of network 33. It should be noted, however, that in a more basic operation of the circuit the inputs to the AND gate stages can be fixed for examining a sufficient number of binary words that will provide a given accuracy of operation. Such embodiment has the disadvantage of requiring more extensive circuitry to perform in comparable fashion. However, for many applications, a fixed binary word examination may be suitable. The number of binary words that must ultimately be examined will depend upon the complexity of waveforms and the desired accuracy of operation.

With specific reference to the embodiment under consideration only digrams through hexagrams, of which there are a total of 124, are initially examined. When necessary, selected higher order *n*-grams may be examined also, as will be seen. It is noted that the information contained in all *n*-grams of a given order includes information contained in all lower order *n*-grams. Thus, it is possible to examine only the highest order *n*-grams that are initially to be considered and from these compute the frequencies of occurrence of all lower order *n*-grams. With respect to the di-delay-grams, 200 are examined. This is the maximum number that can be derived from a 50 stage shift register.

In the drawing a single AND gate stage $33_1$ for examining *n*-grams is specifically illustrated, with the remaining stages $33_2$ through $33_u$ being schematically indicated. Similarly, a single AND gate stage $33_{u+1}$ for examining di-delay-grams is specifically illustrated and the remaining stages $33_{u+2}$ through $33_{u+v}$ are schematically indicated. The inputs to stage $33_1$ are connected so as to examine the hexagram 101101. Every time this hexagram occurs in the digital code as shifted through the shift register, an output pulse is generated from the AND gate of stage $33_1$. The inputs to stage $33_{u+1}$ are connected so as to examine the di-delay-gram 10 with a delay of five bits. Every time this di-delay-gram occurs an output pulse is generated from the AND gate of stage $33_{u+1}$. The remaining AND gate stages have inputs connected so as to examine the other $n$-grams through hexagrams, and higher order $n$-grams when necessary, as well as the other di-delay-grams.

The output pulses from multiple AND gate network 33 are applied to counter network 34, as well as to the first section binary word processing means 4. The counter network 34 counts the frequencies of occurrence of each of the binary words that are examined by the AND gate network 33. For each AND gate stage of network 33 there is a corresponding counter stage. Only stage $34_1$ is illustrated, and the remaining counter stages $34_2$ through $34_{u+v}$, each of which is identical to stage $34_1$ are schematically indicated. Stage $34_1$ is seen to include a counter circuit 37, serially connected to a read-out gate 38. The counter circuit 37 counts the output pulses from stage $33_1$ over a period $T_2$ which corresponds to the period of the individual waveform members of each class being considered. Since the counter 37 is intended to provide a frequency of occurrence computation, it is necessary to include, either in the circuit 37 or in another portion of the circuit, a constant such as will appropriately provide such computation. The frequency of occurrence, as previously indicated, may be approximated by $N/b$, where N is the number of counts in a period of a given waveform and $b$ is the number of sampled bits in said period. A read-out pulse at time $T_2$, as illustrated in graph $e$ of FIG. 11, is applied to the read-out gate 38 for causing counter 37 to be read out every waveform period. This read-out pulse is generated in time base generator 26 and applied along conductor 39. A reset pulse is applied from time base generator 26 through conductor 40 to the counter 37, the pulse occurring at time $T_2+\tau_1$, as illustrated in graph $f$ of FIG. 11, for resetting the counter.

At the output of network 34, the counts in the counters of the various stages, which are the frequency of occurrence coefficients, are by a first connection applied to storage means 5, by a second connection are applied to the first section binary word processing means 4 and by a third connection are applied to a test read-out network 70. The count in counter $34_l$ is designated in the figure as $C_{al}$, where the subscript $a$ represents class A and $l$ the binary word characteristic being considered. The storage means 5 includes a read-in network 41, a first storage matrix 42 for storing data of class A, a second storage matrix 43 for storing data of class B, read-out networks 44 and 45, a converter network 64, a pulse generator 66 and a stepping switch 67.

The first section binary word processing means 4 includes a plurality of identical stages $4_1$ through $4_{u+v}$, there being one stage for each stage of counter network 34. The first stage $4_1$ of means 4 is illustrated in detail and includes a network 46 for taking square functions, an add network 47, a counter 48, a first read-out gate 49, a second means 50 for taking square functions, a subtract network 51, a means 52 for taking square root functions and a second read-out gate 53. Square network 46 is connected at one input to means 4 and computes the square of the counts from the counter stage $34_1$, the squared values being summated in add network 47. Network 47 includes a gain constant which will provide at its output an average value of the summated squares. The output from add network 47 is connected as a first input to subtract network 51. At a second input to means 4 there is connected the counter network 48 which counts the output from stage $33_1$ over a period $T_3$, which is the period for a whole family of waveforms. The output of counter 48 is connected to read-out 49 which has applied thereto a read-out pulse occurring at $T_3$. The read-out pulse is derived from time base generator 26 along conductor 54 and is illustrated in graph $g$ of FIG. 11. Associated with the counter 48 is a gain factor which produces at the output of gate 49 the mean value of the frequencies of occurrence of the particular hexagram being examined for the various members of a single class. A reset pulse occurring at time $T_3+\tau_1$ is applied from time base generator 26 by means of conductor 55 to counter network 48, the reset pulse being shown in graph $h$ of FIG. 11. The output of read-out gate 49 is by a first connection applied to the read-in network 41 of storage means 5 and by a second connection is applied to square network 50. In FIG. 9, this output is designated $M_{a1}$. The square network 50 computes the square of the mean value from read-out gate 49. The output of square network 50 is connected to a second input of subtract network 51. The output of subtract network 51 is applied to square root network 52 for taking the square root of this value and thereby provides the standard deviation $\sigma_{a1}$ of the characteristic under consideration. Thus, the described circuit provides the computation $$\sqrt{\frac{\Sigma C^2}{s}-M^2}$$

where C is the frequency of occurrence coefficient of the given characteristic for each waveform, M is the mean value of the coefficients for all waveforms of the class considered and $s$ is the number of waveforms. The output of square root network 52 is read out through read-out gate 53 having coupled thereto a read-out pulse occurring at time $T_3+\tau_2$, shown in graph $i$ of FIG. 11. This read-out pulse is derived from generator 26 and applied along conductor 56. The output of read-out 63 $\sigma_{a1}$ is applied to the read-in network 41 of storage means 5. It is noted that the mean and standard deviation values, as well as the individual frequencies of occurrence coefficients, for all other examined characteristics are also applied to read-in network 41.

A wide read-in pulse extending over the period $T_3+\tau_3$, as shown in graph $j$ of FIG. 11 is coupled from the time base generator 26 to the network 41 by means of conductor 57. This pulse serves to provide read-in during this period to storage matrix 42 so as to store the information relating to class A. It is noted that in the succeeding sequence of operation wherein the design data waveforms of class B are processed, a second pulse, which is shown to be of opposite polarity, is applied to read-in network 41 so as to provide a read-in of the processed information to storage matrix 43 which stores information relating to class B. Read-in network 41 is primarily a single pole, double throw type switching matrix, but may also perform other functions if necessary, such as to place the information to be stored in a form compatible with the storage means. Accordingly, the read-in network 41 is connected to storage matrices 42 and 43 for storing the individual frequency of occurrence coefficients for each characteristic examined, the mean values of each characteristic for each class and the standard deviation values of each characteristic for each class, connection being made in a sequential fashion as above stated.

The mean and standard deviation values stored in matrices 42 and 43 are read out through a mean and standard deviation sequential read-out network which has been identified as network 44. The individual frequency of occurrence coefficients for each waveform member stored in matrices 42 and 43 are read out through a frequency of occurrence coefficients read-out network 45.

The output from read-out network 44 is connected to the second section binary word processing means 6 which includes a subtract network 60, add network 61, divide network 62 and a threshold network 63. A pair of outputs $M_a$ and $M_b$ from read-out network 44, representing the mean values of a given characteristic for each class, are applied to the subtract network 60 and the difference computed. The absolute value of the difference is applied as the first input to divide network 62 and is the dividend. In a similar fashion, a pair of outputs $\sigma_a$ and $\sigma_b$ from network 44, representing the standard deviation of a given characteristic for each class, are applied to add network 61. The output sum is applied as the second input to divide network 62 and is the divisor. The divide network provides at its output the quotient of the inputs. Thus, the computation $$\frac{|M_a - M_b|}{\sigma_a + \sigma_b}$$

is performed so as to provide the previously referred to *m/d* ratio. The output of divide network 62 is applied to the threshold network 63 and if it exceeds a given value an output is generated from the threshold network. In addition, the output from divide network 62 is connected to the pulse generator 66 and stepping switch 67 of storage means 5, switch 67 being employed to sequence the read-out of storage matrices 42 and 43. In combination with this sequence a read-out pulse from generator 26 is applied by conductor 68 to network 44. This read-out pulse, shown in graph *k* of FIG. 11, initiates an automatic read-out sequence of the mean and standard deviation values so as to in a step by step fashion read-out these values for each characteristic. The output from threshold network 63 is applied to read-out network 45 so as to provide actuation of this read-out network for only those frequency of occurrence coefficients of characteristics whose *m/d* ratios exceed the threshold value.

These coefficients are entered into the categorizing means 7 through converter network 64 which converts the input thereto into a cyclic code, also termed the Gray code, for application to the main body 65 of the categorizing means. As previously noted, the categorizing means assigns weighting factors for the applied frequency of occurrence coefficients so as to provide weighted sums that may be separated as between classes. More specifically, there is shown in schematic form the output portion of the categorizing means 7 which includes a resistor matrix 69, the values of which are adjusted as the categorizor learns to distinguish classes of waveforms, a sum network 71, a pair of indicators 72 and 73 for class A and class B decisions, respectively. A feedback connection 74 is provided from the categorizing means 7 to the binary word setting switching matrix 32 for two primary purposes. It changes the connections from the shift register to the AND gate stages so as to examine higher order *n*-grams, when this is necessary for providing sufficiently accurate operation of the categorizing means. The feedback connection is also employed in the processing of the test data waveforms, which is done after the design data waveform analysis is completed. In this portion of the operation, the feedback pulse causes the connections from the shift register to the AND gate stages to be modified so as to tabulate in counter network 34 only those characteristics that have been selected as being good distinguishing characteristics. As stated previously, an output from the counter network 34 is provided through read-out gate 70 to the output portion of the categorizing means, the read-out gate 70 being pulsed at time $T_2$ during the test sequence. Thus, the selected frequency of occurrence coefficients are directly entered into the categorizing means.

With reference to the operation of the detailed block diagram of FIG. 9, the design data waveforms of class A and B are first processed in a sequential manner, the waveforms of class A being processed followed by the waveforms of class B. A selection of good distinguishing binary word characteristics is thereby made. Following this, the test data waveforms of classes A and B are processed so as to provide a reliable measure of the system's accuracy.

Considering first a processing of the waveforms of class A, in a timed operation, corresponding to that set forth in the timing diagram of FIG. 11, each waveform is first sampled and converted into a digital code in sampling and encoding means 2, as has been previously described. Subsequent in time, an initial selection of binary words contained in the digital codes of the waveforms, in the form of *n*-grams and *n*-delay-grams, are examined and their frequencies of occurrence tabulated by binary word setting and tabulating means 3. The individual frequency of occurrence coefficients for each of the tabulated binary words for each waveform member are stored in the matrix 42. In addition, an output from the AND gate network 33 and counter network 34 are applied to the first section binary word processing means 4 so as to derive the mean and standard deviation values for each of the examined binary word characteristics of the waveforms of class A. These are then stored in storage matrix 42. After the processed information for each of the waveforms of the design data waveforms of class A is stored, the design data waveforms of class B are processed in an identical fashion and the individual frequency of occurrence coefficients and the mean and standard deviation values for the waveforms of class B are stored in storage matrix 43.

Upon completion of this process, the mean and standard deviation values for each characteristic and for each class are read out in sequential fashion from storage matrices 42 and 43 and into the second section binary word processing means 6 wherein the *m/d* ratios for each characteristic are computed. The *m/d* ratios are applied to the threshold network 63 within means 6, which is adjusted to a given value that will pass only a limited number of the best *m/d* ratios, e.g., twenty. The threshold is normally made adjustable and set in accordance with the requirements of a particular system and operation. The output from the threshold network is employed to read out from storage matrices 42 and 43 the individual frequency of occurrence coefficients of characteristics having *m/d* ratios which exceed the threshold. These coefficients are then entered into the categorizing means 7 and weighting factors are assigned. The categorizing means also gives an indication of the relative goodness of the entered characteristics in that higher value weighting factors are assigned for the characteristics of better discrimination and, correspondingly, lower weighting factors for the characteristics of lesser discrimination. In addition, the categorizing means provides a projected accuracy with which it will subsequently be able to distinguish waveforms of classes A and B by means of the frequency of occurrence coefficients for the characteristics it has previously seen.

If the projected accuracy is insufficient, a signal is fed back to the binary word switching matrix 32 to change the connection from the shift register 31 to the multiple input AND gate network 33. Examination of the hexagram binary words having relatively high weighting factors assigned by the categorizing means, e.g., those which fall within the upper half, is terminated. There is substituted examination of four of the next highest order of *n*-grams, in this case heptagrams, that are derived from the cancelled words and which would include the cancelled word form. For example, if the hexagram 101101 is to be cancelled, the following words are substituted: 1101101; 0101101; 1011010 and 1011011. This procedure offers considerable promise for discovering characteristics of improved discrimination, and also higher *m/d* ratios. The design data waveforms of classes A and B are then re-run through the shift register and the new words along with the remaining old words that have not been cancelled are processed as previously described. The *m/d* ratios are again computed and passed through the threshold network and a new set of frequency of occurrence coefficients thereby applied to the categorizing means which would be expected to provide an improved accuracy in the categorizing function. If necessary, this iterative process may continue until the projected accuracy is sufficiently improved.

When the attainment of a required accuracy is indicated by the categorizing means, the test data waveforms of classes A and B are individually processed. The timing sequence for this operation is presented by several of the graphs of FIG. 11. Accordingly, the test data waveforms are sampled, encoded and run through the shift register, as previously described. The clock pulses occurring at $T_1$ and the shift pulses occurring at $T_1+r_1$ are employed for these functions. Only the binary word characteristics finally selected in processing the design data waveforms are examined and tabulated. The selected binary word characteristics are examined and read out of multiple AND gate network 33 at time $T_1+r_2$. The frequencies of occurrence of the characteristics are tabulated and read out of counter network 34 at time $T_2$. At this same time a read-out pulse is applied to read-out network 70 for entering the tabulated frequency of occurrence coefficients into the categorizing means. The coefficients are appropriately weighted in accordance with the previously determined weighting factors and the weighted sums are then employed to identify the waveforms. In the event that the test data waveforms, of which there should be a relatively high number, considerably greater than 2, are identified with required accuracy, the system is considered to be operating satisfactorily and the learning phase is completed. If a required accuracy is not attained, the iterative process previously described with respect to the design data waveforms is again instituted.

Once the learning phase is completed the design of the recognition phase is determined. Referring now to FIG. 10, there is illustrated in detailed block diagram form a recognition phase that has been designed in accordance with information gained from the learning phase. The sampling and encoding means 2′ corresponds exactly to this component in the learning phase of FIG. 9 for providing a digital code from applied analog waveforms. The components are identified the same as in FIG. 9 but with an added prime notation. The output from means 2′ is coupled to a shift register 31′, which may be identical to the shift register previously considered. The output of the shift register is connected through a binary word setting switching matrix 32′ to a multiple input AND gate network 33′. The output of network 33′ is coupled to a counter network 34′. Switching matrix 32′ is set so as to provide connections between the shift register stages and the AND gate network so as to examine only those binary word characteristics that have been identified in the learning phase to be good discriminants. The frequencies of occurrence of these characteristics are tabulated in counter network 34′ and entered into a recognizing means 10, which includes a read-in network 79 coupled to a resistor matrix 75 coupled to a sum network 76 and indicators 77 and 78, similar to the output portion of the categorizing means 7. The resistor matrix 75 of means 10 is set so as to have constant values providing weighting functions in accordance with the weighting functions derived in the categorizing means of the learning phase.

The operation of the resognition phase is in accordance with the timing diagram of FIG. 12 and is essentially identical to that previously considered with respect to the test data waveforms in the learning phase.

The digital technique for recognizing patterns, herein presented, can be employed for recognizing speech events and thus provide an automated recognition of the spoken word. There will now be described a further embodiment of the invention employing a system for accomplishing a speech recognition which assumes the general form described with respect to that of FIGS. 1 and 2. However, it differs in two principal respects from the system described in the detailed block diagram of FIGS. 9 and 10. In lieu of sampling the applied analog waveforms at a fixed frequency, the sampling frequency is a function of the waveform. In the embodiment being considered a sample is taken at each point that the slope of the input waveform is zero. Since same speech events may have different waveform shapes as a function of the speech frequency, by sampling in the manner described a digital code is provided for a given speech event that is essentially invarient with the shape of the waveform. The encoding algorithm is as before and samples of positive polarity are represented by a binary "1" and samples of a negative polarity and zero crossings by a binary "0."

As a second difference, the frequency of occurrence of selected binary words are tabulated over variable time increments, each time increment corresponding to the pronunciation of a speech event. A speech event corresponds to a class of waveforms and each pronunciation of a speech event corresponds to a member of the class. For each speech event pronounced there are examined the frequencies of occurrence of various binary words.

Similar to the previously described embodiment, there are determined those binary words having frequencies of occurrence substantially invariant with respect to the members of a single class and which are variant and provide discrimination among different classes. Since the speech recognition system is basically similar to the system of FIGS. 9 and 10, only those portions that have been said to be significantly different will be illustrated.

With reference to FIG. 13, there is illustrated a sampling and encoding means 80 which may be employed in the speech recognition embodiment of the invention. Means 80 is different from that of means 2 of FIG. 9 in that the sampling frequency is derived as a function of the analog input waveform, providing a sample at the zero slope points of said waveform. The means 80 includes at the input an amplifier 81 serially connected to a low-pass filter 82. The output of the filter 82 is coupled to a limiting network 83 which hard limits the analog signal. The output of limiter 83 is coupled in a push-pull arrangement to a pair of read-out gates 84 and 85, providing an enabling input of opposite polarity to said gates. The output of low-pass filter 82 is further connected to a second channel including a differentiating network 86 serially connected to a limiter 87. The output of limiter 87 is connected through a second differentiating network 88 to a diode network 89. Connected in shunt with network 88 is the series arrangement of an inverter network 90 and a third differentiating network 91, the output of which is connected to network 89. At the output differentiating networks 88 and 91 are produced a series of complementary positive and negative pulses occurring at each of the zero slope points of the analog input. Diode network 89 passes only the positive pulses and the output thereof is connected as a second input to both the read-out gates 84 and 85 for establishing the sampling frequency. The outputs of readout gates 84 and 85 are connected to multivibrator networks 92 and 93, respectively, which supply digitized codes of the input analog waveforms to the shift register, which may be a similar component to that illustrated in FIG. 9.

In FIG. 14 there is illustrated an integrating network 94 that is employed in the speech recognition embodiment. Network 94 is used in lieu of the counter network 34 of FIG. 9, and includes an array of similar integrating stages, one for each binary word that is examined. Only one stage $\mathbf{94_1}$ is specifically illustrated, which is seen to include an RC network 95 coupled to a read-out gate 96. The RC network has a time constant that is a fraction of the duration of a speech event, e.g., on the order of ⅓ to ⅙ and provides a tabulation of binary word frequencies of occurrence for a given time period of the immediate past. In a typical operation the time constant is 50 milliseconds and a speech event is on the average 150 milliseconds. A read-out pulse is applied to read-out gate 96 which reads the integrated value of the RC network at the end of a speech event. There are a number of techniques that may be employed for determining when the end of a speech event occurs. In one such technique, the rate of zero crossings of the analog waveform is plotted and the period for which the rate is approximately constant is interpreted as a speech event duration.

As an examined binary word occurs in a given code, a pulse of charge is applied to the capacitor of network 95 for each occurrence. Thus, the charge on the capacitor is proportional to the number of occurrences in the recent past. Since the time constant of network 95 is appreciably less than the speech event duration, stored charge at the end of each speech event provides a measure of the number of occurrences within the speech event, which can be readily transformed into frequency of occurrence.

The presently described circuit has been found to be very effective and yet simple for tabulating frequencies of occurrence of the different speech events that normally occur in succession and which are of different duration. An alternative technique that could be employed, although with considerably more complexity, includes the use of a counter network wherein the counter is either emptied each time a read-out occurs, or where there are provided means for determining the count increment during successive read-outs.

It may be appreciated that in the implementation of the described systems an analog or a digital circuitry can be alternatively employed by one skilled in the art for most of the presented networks.

The pattern recognition system of the present invention, which may also be referred to as a frequency of occurrence of binary words technique, has been described with respect to specific embodiments for the purpose of clear and complete disclosure. It is not intended, however, that the invention be limited to the described embodiments in any way, it being recognized that numerous alternatives and modifications of the described circuitry can be made which do not exceed the basic invention herein taught. Accordingly, the bounds and metes of the invention are to be found only in the appended claims.

What I claim as new and desire to secure by Letters Patent of the United States is:

1. Apparatus for recognizing patterns in the form of analog waveforms as belonging to a specific class of a number of classes, comprising:

(a) sampling means for sampling waveforms of known classes of origin, (b) encoding means for encoding the samples derived from said sampling means so as to provide for each waveform a corresponding individual digital code, (c) examining means for examining each of said digital codes for the presence of selected binary words having a length appreciably shorter than the individual codes, (d) tabulating means for tabulating the discrete frequency of occurrence for each selected binary word within each digital code, (e) comparison means for performing an orderly comparison of the tabulated frequencies of occurrence of said binary words so as to identify a limited number of binary words which exhibit an invariant property with respect to patterns of a single class and a variant property with respect to patterns of different classes, (f) categorizing means for assigning weighting factors for inputs of different characteristics so as to establish a hyper-plane in a decision space that separates inputs of one common characteristic from inputs of a second common characteristic, (g) means for applying the tabulated frequencies of occurrence of said limited number of binary words to said categorizing means whereby said weighting factors are assigned for the tabulated frequencies of occurrence so as to separate the waveforms of one class of waveforms from the waveforms of a second class of waveforms, and (h) recognition means employing the assigned weighting factors for recognizing the specific class of origin for unknown waveforms belonging to the previously processed classes.

2. Apparatus as in claim 1 wherein said comparison means includes a computing means for computing for each class the mean values and standard deviation values of the tabulated frequencies of occurrence of each binary word.

3. Apparatus as in claim 1 wherein said examining means includes a multi-stage shift register responsive to a sequential application of said digital codes and a multiplicity of AND gate networks each responsive to the presence of a different binary word contained within said digital codes, outputs from the various stages of said shift register arranged in groups of several discrete bits each for forming said selected binary words being selectively coupled to said multiplicity of AND gate networks.

4. Apparatus as in claim 3 wherein said shift register stage outputs are coupled to said AND gate network so as to examine selected binary words in the form of *n*-grams and *n*-delay-grams, where an *n*-gram is a binary word the digits of which are adjacent and which in number correspond to the order of *n*, and an *n*-delay-gram is a binary word having digits which in number correspond to the order of *n* with various delays interposed therebetween.

5. Apparatus for recognizing patterns in the form of analog waveforms as belonging to a specific class of a number of classes, comprising:

(a) sampling means for sampling waveforms of known classes of origin, (b) encoding means for encoding the samples derived from said sampling means so as to provide for each waveform a corresponding individual digital code, (c) a multi-stage shift register means responsive to a sequential application of said digital codes, (d) examining means responsive to the outputs from the various stages of said shift register means for examining said codes for the presence of selected binary words having a length appreciably shorter than the individual codes, (e) tabulating means for tabulating for each code the indivdual frequencies of occurrence of said selected binary words, (f) first computing means for computing for each class the mean values and standard deviation values of the tabulated frequencies of occurrence of each binary word, (g) storage means for storing the tabulated frequencies of occurrence and the computed mean values and standard deviation values, (h) second computing means for computing for each binary word, taking the classes two at one time, the ratio of the difference of the mean values to the sum of the standard deviation values, (i) categorizing means for assigning weighting factors for inputs of different characteristics so as to establish a hyper-plane in a decision space that separates the inputs of one common characteristic from inputs of a second common characteristic, (j) sensing means responsive to relatively high high ratios of said second computing means for reading out from said storage means and applying to said categorizing means the tabulated frequencies of occurrence of the binary words corresponding to said relatively high value ratios, whereby weighting factors are assigned for the applied tabulated frequencies of occurrence which separate the waveforms of one class from the waveforms of a second class, and (k) recognition means employing the assigned weighting factors for recognizing the specific class of origin for unknown waveforms belonging to the previously processed classes.

6. Apparatus as in claim 5 wherein said recognition means includes means for tabulating for each code of said unknown waveforms the frequencies of occurrence of the binary words corresponding to said relatively high value ratios.

7. Apparatus as in claim 6 wherein said examining means includes a multiplicity of AND gate networks each responsive to the presence of a different binary word contained within said digital codes and a binary word setting switching matrix for selectively coupling the outputs from the various stages of said shift register means to said AND gate networks.

8. Apparatus as in claim 7 wherein the shift register means outputs are coupled to said AND gate networks so as to examine selected binary words in the form of *n*-grams and *n*-delay-grams, where an *n*-gram is a binary word the digits of which are adjacent and which in number correspond to the order of *n*, and an *n*-delay-gram is a binary word having digits which in number correspond to the order of *n* with various delays interposed therebetween.

9. Apparatus as in claim 8 wherein a feedback connection is provided between said categorizing means and said binary word setting switching matrix for adjusting the setting of said matrix in response to the operation of said categorizing means.

10. Apparatus as in claim 6 wherein the applied waveforms are statistically constant with time and said sampling means provides a constant sampling frequency.

11. Apparatus as in claim 6 wherein the applied waveforms are satistically varying with time and said sampling means provides a variable sampling frequency that is a function of the shape of said applied waveforms.

12. Apparatus as in claim 11 wherein said tabulating means includes an RC network having a time constant appreciably less than the duration of each waveform.

13. Apparatus for recognizing patterns of analog waveforms comprising:

(a) converting means for converting said analog waveforms into corresponding individual digital codes, (b) examining means for examining each of said digital codes for the presence of selected binary words having a length appreciably shorter than the individual codes, said examining means including (c) a multi-stage shift register responsive to a sequential application of said digital codes and a multiplicity of AND gate networks each responsive to the presence of a different binary word contained within said digital codes, outputs from the various stages of said shift register arranged in groups of several discrete bits each for forming said selected binary words being selectively coupled to said multiplicity of AND gate networks, said selected binary words being in the form of *n*-grams and *n*-delay-grams, where an *n*-gram is a binary word the digits of which are adjacent and which in number correspond to the order of *n*, and an *n*-delay-gram is a binary word having digits which in number correspond to the order of *n* with various delays interposed therebetween.

References Cited

UNITED STATES PATENTS

| | | | |
|---|---|---|---|
| 2,947,971 | 8/1960 | Glauberman et al. | 340—172.5 |
| 3,187,305 | 6/1965 | Chiang | 340—146.3 |
| 3,239,811 | 3/1966 | Bonner | 340—146.3 |
| 3,166,640 | 1/1965 | Dersch | 340—146.3 X |
| 3,209,328 | 9/1965 | Bonner | 340—146.3 |
| 3,267,431 | 8/1966 | Greenberg | 340—146.3 |
| 3,267,439 | 8/1966 | Bonner | 340—146.3 X |

OTHER REFERENCES

Steck, Stochastic Model for the Browning Bledsoe Pattern Recognition Scheme, IRE Transactions on Electronic Computers, April 1962, pages 274–282.

THOMAS A. ROBINSON, Primary Examiner

U.S. Cl. X.R.

179—1; 340—172.5